July 17, 1923.

L. A. LAURSEN 1,462,139

GEAR SHIFTING DEVICE

Filed March 9, 1921

INVENTOR
L. A. Laursen
BY
Robb & Robb & Hill
ATTY'S

July 17, 1923.
L. A. LAURSEN
GEAR SHIFTING DEVICE
Filed March 9, 1921
1,462,139
4 Sheets-Sheet 2
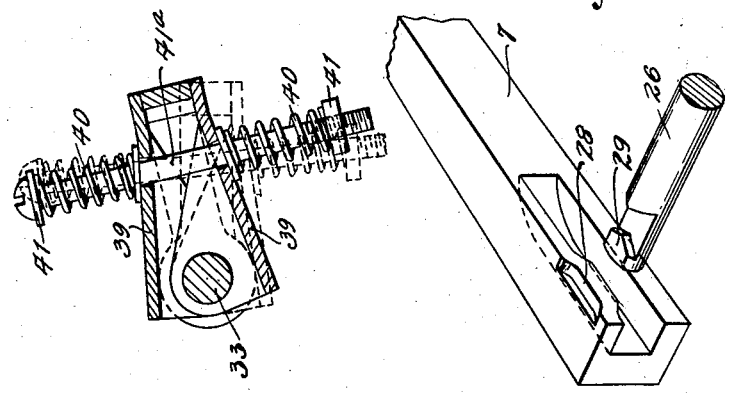
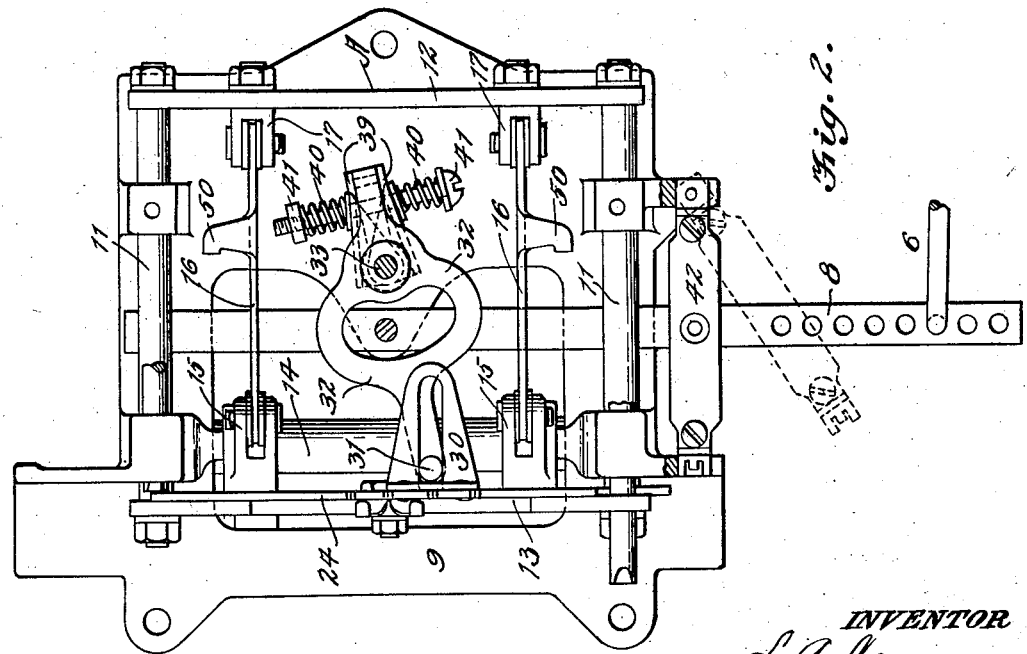
INVENTOR
L. A. Laursen
BY
Robb, Robb & Hill
ATTY'S July 17, 1923.
L. A. LAURSEN
GEAR SHIFTING DEVICE
Filed March 9, 1921
1,462,139
4 Sheets-Sheet 3
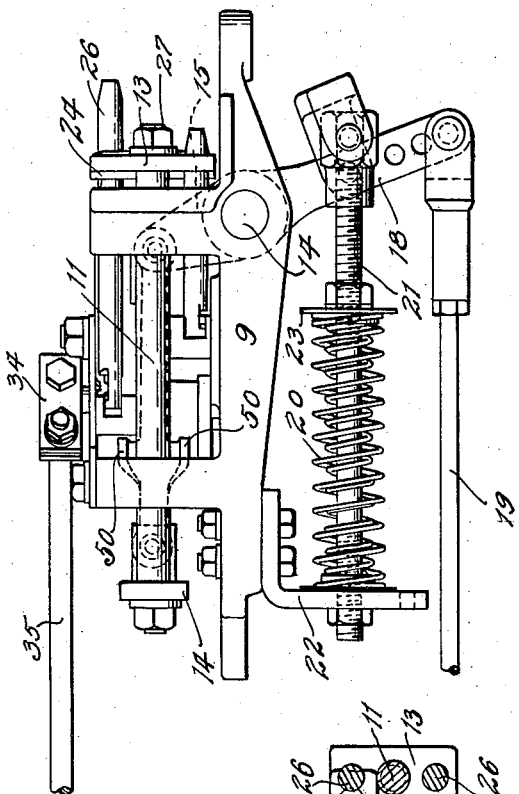
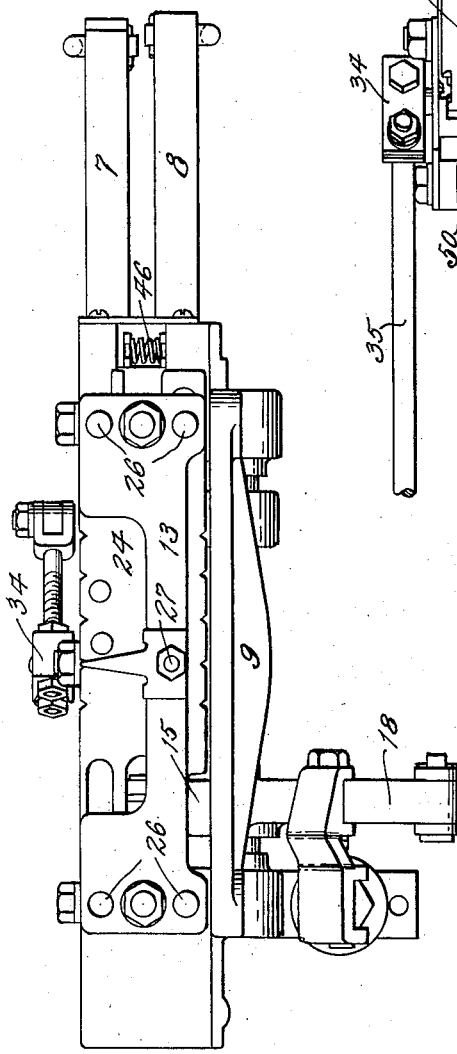
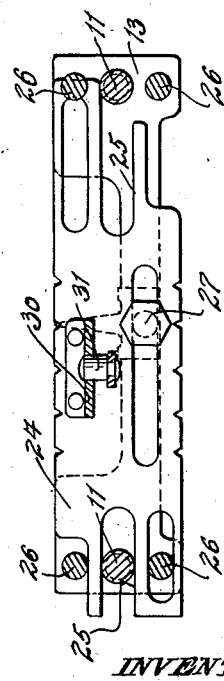
INVENTOR
L. A. Laursen
BY
Robb, Robb & Hill
ATTY'S July 17, 1923. 1,462,139
L. A. LAURSEN
GEAR SHIFTING DEVICE
Filed March 9, 1921 4 Sheets-Sheet 4
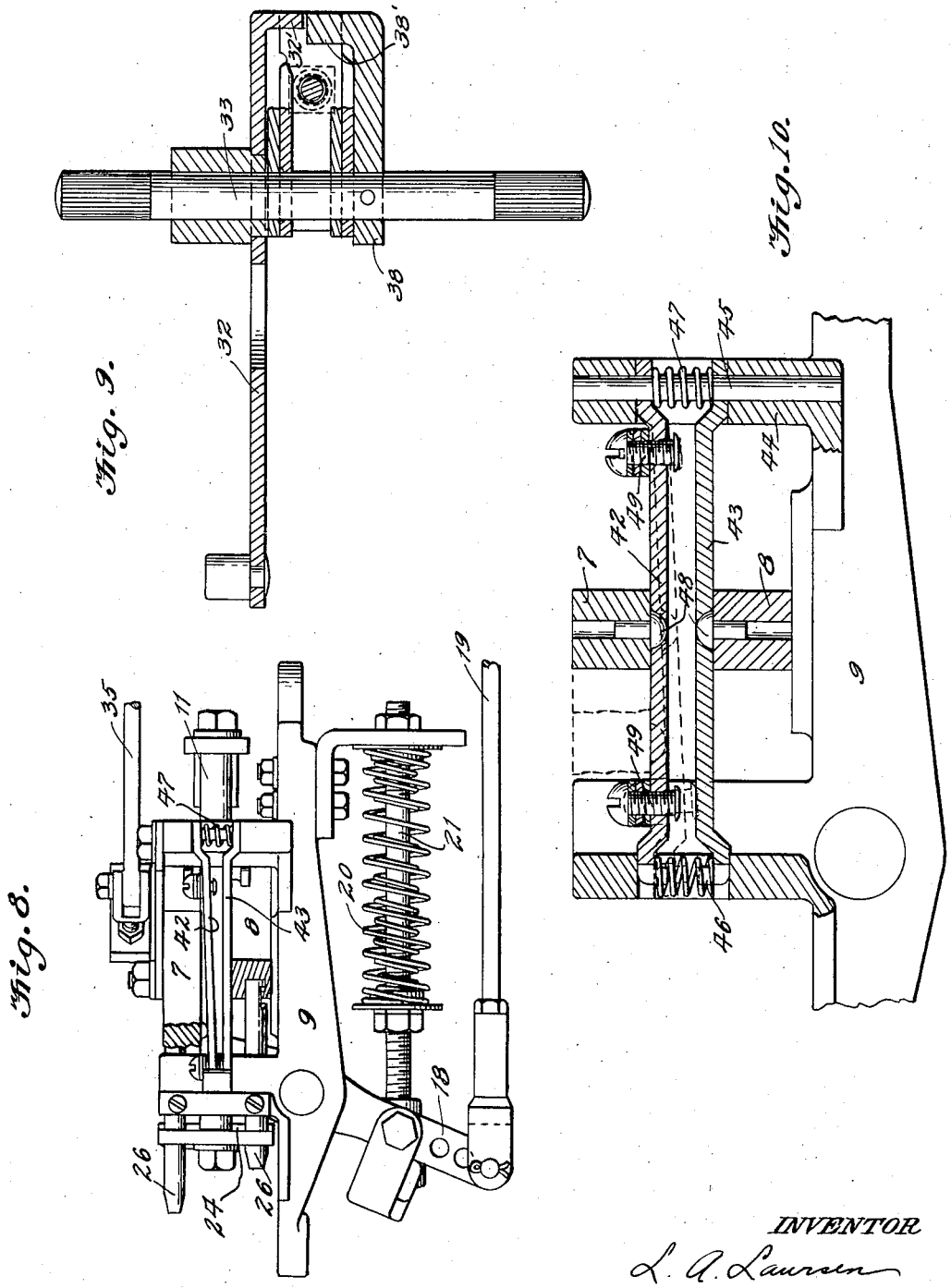

Patented July 17, 1923.

1,462,139

UNITED STATES PATENT OFFICE.

LAURITS A. LAURSEN, OF EAU CLAIRE, WISCONSIN, ASSIGNOR TO JAMES T. JOYCE, TRUSTEE FOR UNITED STATES AUTO GEAR SHIFT COMPANY.

GEAR-SHIFTING DEVICE.

Application filed March 9, 1921. Serial No. 450,858.

*To all whom it may concern:*

Be it known that I, LAURITS A. LAURSEN, a citizen of the United States, residing at Eau Claire, in the county of Eau Claire and State of Wisconsin, have invented certain new and useful Improvements in Gear Shifting Devices, of which the following is a specification.

In my application for patent, Serial No. 424,210, filed November 15, 1920, I have set forth a certain new and improved mechanical gear shifting mechanism which utilizes as its principal features a main actuator for causing shifting movement of the gears of change speed transmission mechanism, a selector associated with said actuator for operation by the latter to selectively predetermine and move a particular gear to effect a desired transition from one speed to another, and a controller manipulative for the selection or preselection of the particular gear transition to be effected, together with some additional detail features of construction.

It is the object of my present invention to employ certain novel means whereby the locking and retarding contrivances employed in my mechanism, for the purpose of locking certain gears in neutral, whilst another gear is active for speed transmission, and to retard the movement of the gears as they pass through neutral, may be rendered interchangeably effective or non-effective, depending upon the particular kind of gear transmission mechanism to which my gear shifting unit is applied.

Setting forth the above mentioned feature more fully it is notable that it is essential to my invention that it be applicable as a unit, to as many makes of automobiles as possible, in substitution for the ordinarily used lever shifting means. In some transmissions for certain cars the gear locking and retarding contrivances are contained in the transmission casing and are of such a nature that they have positive locking actions which would interfere with the application of my mechanism to such a type of transmission because the locking and retarding means employed by me could not be adjusted to a nicety to work in conjunction therewith.

With respect to other types of transmissions, however, the neutral locking pins are in the transmission slides which move the gears and do not prevent the employment of my peculiar locking and retarding devices forming a part of my gear shifting unit, in connection therewith.

In the circumstances, as premised already, I have designed the said locking and retarding means of my shifting unit so that it may be rendered effective or ineffective dependent upon whether the particular transmission with which it will be employed requires some effective means of this sort or not.

Additional to the foregoing I have redesigned my mechanism somewhat to afford an increased compactness in regard to its unit construction, and I employ an improved arrangement of the means for neutralizing the gear shifting levers forming a part of said unit. In other respects I have refined my construction so as to promote the simplicity and effectiveness thereof from the manufacturing viewpoint, there being included certain other details of construction which are new and advantageous, as will be pointed out more fully hereinafter.

In the accompanying drawings:—

Figure 2 is a horizontal sectional view of the same, the controller and transmission parts omitted;

Figure 3 is a sectional view of the safety connector;

Figure 4 is a fragmentary prospective, parts detached showing the connection of the lever and an adjacent plunger;

Figure 5 is a rear elevation of the gear shifting unit;

Figure 6 is a vertical section which brings out somewhat more clearly the mounting of the selector which slides transversely of the unit;

Figure 7 is a side elevation which shows more clearly the operating connection with the clutch lever and the spring or power device adapted to impart the effective gear operating stroke to the selector and the actuating frame by which the selector is carried;

Figure 8 is a side elevation from the side opposite that illustrated in Figure 7;

Figure 9 is a vertical sectional view showing more clearly the parts of the safety connector, and the operating arm for the selector plate;

Figure 10 is a vertical sectional view through the locking and retarding contrivances and the levers which coact therewith.

Figure 1:
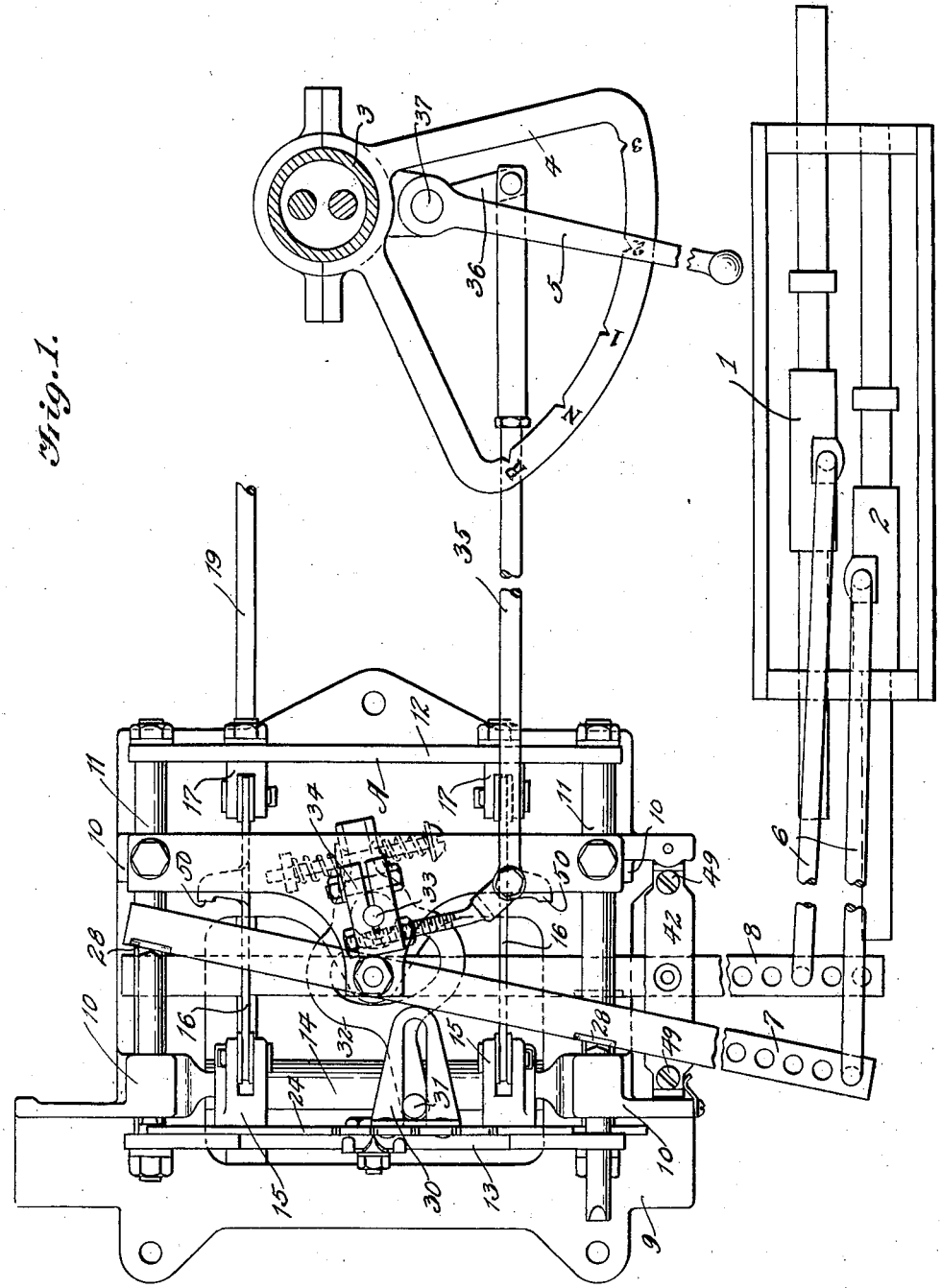
Figure 1 is a plan view of the gear shifting unit with cover plates removed, the same illustrated as connected up with a controller for the selector and with the gear slides of a speed changing mechanism.

Referring particularly to Figure 1 of the drawings the transmission mechanism is partially illustrated as comprising the gear slides 1 and 2, the steering column is designated 3, and on the steering column is located the controller of my gear shift, the same comprising the indicating segment 4 with indicia showing the proper positions of the controller or handle 5 when adjusted for obtaining different gear transitions. Rods 6 connect the gear slides 1 and 2 with operating levers 7 and 8, located one above the other and adapted to be actuated by movement in opposite directions to impart corresponding movements to the gear slides 1 and 2.

The means for operating and controlling the levers 7 and 8 contain the principal features of this invention. My shifting unit embodies a suitable base casting 9 having vertical lugs 10 in which are mounted the guide and supporting rods 11 of an actuating frame which includes said rods and opposite end plates 12 and 13. The frame as a whole is designated A and is adapted to reciprocate relatively to the lugs 10 when properly actuated. The means for moving the frame A are shown best in Figures 2 and 7 as comprising a rock shaft 14 having upwardly extending arms 15 connected by links 16 with coupling members 17 on the end plate 12 of the frame A. An arm 18 extends downwardly from the shaft 14 and is adapted to be connected by a rod 19 with the clutch lever of the automobile in connection with which my mechanism is to be used. Normally spring means as shown at 20 maintain the arm or lever 18 in the position of Figure 7, said spring means embodying a spring which encircles a rod 21 connected with the arm 18 and slidable through a bracket 22 fastened to the base casting 9 of the device. The spring parts 20 are interposed between an abutment 23 fast to and adjustable upon the rod 21, and the bracket 22. Mounted for transverse movement on the frame A, which is really a main actuator, is a selector 24 in the form of a slide which has end slots 25 engaging the guide rods 11 so as to be guided thereby. The selector 24 has open and solid portions adapted to be brought selectively opposite a series of four plungers 26 arranged in pairs at opposite sides of the frame A slidable in the rearmost lugs 10 which act as supports therefor. These plungers 26 are provided one for reverse, one for first, one for second, and one for third speed transition purposes. When a certain solid portion of the selector 24 is brought opposite to a predetermined plunger 26, and the selector moved forwardly with the frame A upon which it is mounted and carried, obviously that particular plunger will be moved. The connection between the selector 24 and the frame A comprises a stud bolt 27 which passes through a slot in the rear bar or plate 13 of said frame.

Each plunger 26 is connected with the adjacent portion of one of the levers, as shown at 28 and 29 in Figure 4, the levers being milled out and a wall of the milled portion being depressed to engage the plunger, for the purpose of establishing said connections.

Extending forwardly from the selector 24 is a slotted arm 30 receiving a stud 31 which projects upwardly from a selector actuating arm, seen best in Figures 1, 2 and 9. The arm 32 is pivoted to a vertical axis 33, but is loose upon said axis which carries at its upper end the fixed arm 34 for causing turning movement thereof, the said arm 34 being in turn connected with the rod 35 leading forwardly to the controller arm 36 on the axis 37 of the controller or handle. Interposed between the controller 5 and the selector actuating arm 32 are not only the parts just above described, but also a yielding connection established by the loose mounting of the arm 32 on the axis 33, and by an arm 38 which is rigid on the axis 33 below the front end of the arm 32, there being a pair of spring pressed plates 39 loosely pivoted to the axis 33. The plates have their front ends bearing against a downwardly projecting lug 32 and an upwardly projecting lug 38' of the parts 32 and 38 respectively. The said plates 39 are held pressed against opposite sides of the lugs 32' and 38' by springs 40 carried by the opposite ends of a rod 41$^a$ which passes transversely through the plates. The springs 40 bear at one end against the plates 39, and at their opposite ends they bear against abutments 41.

The operation of the foregoing construction will be later set forth. At one side of the frame A and acting upon the free end portions of the levers 7 and 8 are located the locking and retarding contrivances forming a special feature of this invention. Referring to Figure 10 these contrivances will be seen to consist of an upper plate 42 and a lower plate 43 having their opposite ends seated in recesses in lugs 44 on the base plate 9. A post 45 passes through adjacent superposed ends of the plates 42 and 43, and the opposite superposed ends have upwardly bent lugs receiving the opposite ends of a spring 46 normally tending to hold said plate separated. A corresponding spring 47 encircles the post 45 and acts in the same way on the opposite ends of the plates 42 and 43. The said plates extend or are arranged between the levers 7 and 8. Each lever has a projection 48 adapted to engage in a locking seat or recess in the adjacent plate, see Figure 10.

When the parts are arranged as shown in Figure 10, a pair of abutment screws 49 are adjusted with their lower ends projecting the maximum distance of adjustment downwards toward the plate 43, said screws being carried by the upper plate 42. Springs intermediate the heads of the screws 49, and the plate 42, prevent the screws from becoming accidently loosened or moved out of adjustment, once properly set.

With the construction of the plates 42 and 43, and adjacent parts, in mind, and noting the relation of the levers 7 and 8 thereto, it will be evident that when the lever 7 is moved in either of opposite directions the upper plate will be forced downwardly at one end thereof, by the projection 48 becoming disengaged from its cooperating recess. Such movement of the plate 42 carries it to a position preventing sufficient upward movement of the plate 43 to permit movement of the lever 8 when the lever 7 is not in its neutral or middle position. The opposite action takes place when the lever 8 is moved from neutral whilst the lever 7 is at neutral, so that it is impossible for either lever to be operated when the other lever has been previously operated to obtain a desired gear transition. The means just described is necessary and useful for employment when my gear shifting unit is applied to cars not having a positive locking device in the transmission mechanism, which device could not, of course, be operated by the parts of my general gear shifting mechanism. When, however, the transmission mechanism is equipped with a special locking contrivance such as the spring actuated pawl utilized in the Buick type cars of today, the locking and retarding means which have been described above are intended to be incapacitated as regards particularly the locking function. In other words, under such conditions I unscrew the screws 49 until their lower extremities are substantially at the under surface of the plate 42. When so disposed the screws 49 are not effective to cause the mutual locking function of the plates 42 and 43, when either of the levers 7 and 8 are operated. In fact, under the last mentioned conditions the plates 42 and 43 are capable of sufficient relative movement to permit both of the levers 7 and 8 to be operated, the projections 48, however, acting to slightly retard the gears as they reach neutral so that the retarding function is always maintained though the locking function may be rendered operative or inoperative at will dependent upon the type of transmission in connection with which my gear shifting mechanism will be employed.

On the links 16 which connect the shaft 14 with the bar 12 of the actuating frame A I provide offstanding neutralizing lugs 50 designed, upon initial movement of the frame A to invariably restore any operated lever 7 or 8 to neutral position.

With the general construction of my mechanism thus presented, the operation in brief is as follows: Assuming the machine equipped with my invention is proceeding at first or high speed, and the operator wishes to go into second speed, he is at liberty to adjust the controller 5 properly to select said speed. Since the transmission mechanism is in gear and operating, the movement of the controller 5 will be transmitted to the arm 38, see Figure 9, and to one of the plates 39, see Figure 3. The selector arm 32 does not move, but power is thus stored up in one of the springs 40 to shift said arm 32 at the proper time. The operator now depresses the clutch pedal thereby throwing out his clutch, and this exerts a pull on the rod 19 rocking the arm 18, and the arms 15 with the shaft 14, thereby pulling rearwards on the frame A. Certain of the neutralizing lugs 50 engage the previously set actuated one of the levers 7 or 8, thereby restoring said lever to its neutral position. When the frame A reaches approximately its rearmost limit of movement the selector 24 shifts under the influence of the energy stored up in one of the springs 40, as predetermined by the position of the controller 5. Said selector 24 assumes its new selecting position when the operator relieves the pressure on the clutch pedal the spring 20 previously compressed, restores the frame A to its forward position, causing the selector to actuate the proper one of the plungers 26 to move properly the cooperating one of the levers 7 and 8 which shifts the proper gear slide and completes the transition to the second speed. The frame A and the selector are normally maintained in a position in which the selector by bearing against one of the plungers 26 maintains a selected operative gear relation once it has been established. Only when the transmission gearing is at neutral is the selector 24 ineffective so far as its active function above mentioned is concerned.

Of course, if the transmission gearing is at neutral the selector 24 is capable of being shifted directly from the controller 5 notwithstanding the interposition of the yielding connecting devices shown in Figure 3.

Having thus described my invention, what I claim as new and desire to secure by Letters Patent is:—

1. In a gear shifting unit of the type described, for application to different types of change speed gear mechanisms, the combination with gear actuating parts, of locking means for holding either of said parts locked while the other is operative, and instrumentalities whereby the said locking means may be rendered operative or inoperative at will without dismounting it from the device.

2. In a gear shifting unit of the type described, for application to different types of change speed gear mechanisms, the combination with gear actuating parts, of locking means for said gear actuating parts to prevent operation of one of said parts while the other is in active or operated position, said locking means being also adapted to retard the movement of the said parts at their neutral positions, and means for rendering the locking means operative or inoperative at will in respect to one of its functions above described without dismounting it from the device.

3. In a gear shifting unit of the type described, for application to different types of change speed gear mechanisms, the combination with gear actuating parts, of locking means comprising spaced locking plates, means intermediate said plates and the gear actuating parts for causing sufficient movement of either plate, to lock the other plate, when the gear actuating part of either plate is operated, the means intermediate the gear actuating parts and the locking plates being such that when one plate is locked the other plate causes its gear actuating part to be locked.

4. In gear shifting mechanism, gear actuating parts, and complemental locking means intermediate said parts comprising a locking plate for each part, means on each part to actuate its plate when said part is moved, and means intermediate the plates whereby when one plate is actuated the other plate and the gear actuating part associated therewith become locked.

5. Means as claimed in claim 4 combined with instrumentalities whereby the complemental locking action of one plate respecting the other may be incapacitated.

6. Means as claimed in claim 4 combined with abutment members carried by one plate and adjusted thereon to cause the complemental locking action of one plate respecting the other plate to take place, said abutment members being adjustable so as to incapacitate the plates as regards their complemental locking function or operation.

7. In gear shifting mechanism, the combination with gear actuating parts, of neutral retarding and locking means between said parts comprising superposed plates, means resiliently acting to maintain said plates spaced apart, a projection intermediate each gear actuating part and an adjacent one of the plates adapted to interlock with the latter and move the plate as well, and members adjustable upon one of the plates to control a complemental locking action between the two plates as described, and to incapacitate the said action at will.

8. Means substantially as claimed in claim 7 wherein the abutment members comprise screws carried by one plate at its opposite ends and cooperative to limit the movement of the other plate at its opposite ends.

9. In combination, change speed gearing, and a gear shifting unit comprising gear shifting members and locking means for said gear shifting members for holding a member inoperative when another member has been shifted to an active position, and means to render said locking means operative or inoperative at will and without dismounting it from the device, dependent upon whether or not the change speed gearing is equipped with a corresponding locking means.

10. In a gear shifting unit, the combination with a main actuating frame, a selector thereon, operating instrumentalities for the frame and selector, gear shifting members operable by the frame, the operating means for the frame comprising links connected therewith to move the same, and members carried by said links to engage the gear shifting members on initial movement of the frame, to neutralize said gear shifting members.

11. In a gear shifting unit, the combination with a reciprocating actuating frame, of gear shifting members, means whereby the gear shifting members may be selectively operated upon the return movement of the reciprocating frame, a lever, a link connection between the lever and the reciprocating frame, abutments on the link connection adapted to engage the gear shifting members to neutralize the same upon the initial movement of the reciprocating frame, and an operating spring associated with the lever, and placed under tension upon the initial movement thereof to provide the energy for shifting the gears upon the return movement of the lever and reciprocating frame.

12. In a gear shifting unit, the combination with a reciprocating frame, of a gear shifting lever, means upon the reciprocating frame for selectively actuating the gear shifting lever upon the return movement of the frame, a rock shaft, an arm projecting therefrom, a link connecting the arm with the reciprocating frame and provided with an abutment for engaging the gear shifting member to neutralize the same upon the initial movement of the reciprocating frame, a second arm projecting from the rock shaft, and a spring associated with the second arm and mounted to have energy stored up therein upon the initial movement of the reciprocating frame to return the reciprocating frame upon the release thereof and shift the gears.

13. In a gear shifting unit, the combination with a reciprocating frame, of a pair of gear shifting levers, means for selectively operating the gear shifting levers upon the movement of the reciprocating frame in one direction, links connected to the reciprocating frame and provided with abutments to engage the gear shifting levers and neutralize the same upon the movement of the reciprocating frame in the opposite direction, and a spring arranged to have energy stored therein upon the neutralizing movement of the reciprocating frame for subsequently actuating it in the opposite direction to shift the gears.

In testimony whereof I affix my signature.

LAURITS A. LAURSEN.